Patented Oct. 31, 1922.

1,433,925

UNITED STATES PATENT OFFICE.

WALTER BADER, OF SPONDON, NEAR DERBY, ENGLAND, AND DONALD ARCHER NIGHTINGALE, OF CUMBERLAND, MARYLAND.

MANUFACTURE OF AROMATIC DERIVATIVES.

No Drawing.   Application filed June 18, 1921.   Serial No. 478,708.

*To all whom it may concern:*

Be it known that we, WALTER BADER, a citizen of the Swiss Republic, of Spondon, near Derby, England, and DONALD ARCHER NIGHTINGALE, a subject of the King of Great Britain and Ireland, of Cumberland, Maryland, U. S. A., have invented certain new and useful Improvements in or Relating to the Manufacture of Aromatic Derivatives, of which the following is a specification.

Amides of aromatic sulphonic acids are usually prepared by treating the chlorides of such acids with an aqueous solution of ammonia. Under appropriate conditions of temperature and concentration this is an easy and quantitative reaction.

If instead of aqueous ammonia a solution of an alkyl substituted ammonia is made to react upon an aromatic sulphochloride, the resulting product is not the corresponding alkyl sulphonamide, as would be expected. A compound is obtained which is completely and easily soluble in water, probably a quaternary ammonium compound.

We have now found that alkyl sulphonamides can be prepared with high yields by causing alkylamine salts, sulphochlorides and alkali carbonates to react together in the presence of water restricted to a very small quantity.

Instead of alkali carbonate, other suitable neutralizing agents for the acid liberated in the reaction may be employed, such for example as calcium carbonate, other alkali earth carbonates, or other substances having a similar effect, but alkali carbonates are preferable or water soluble substances having a similar effect.

In carrying out the invention we mix the sulphochloride with the alkylamine salt and add the alkali carbonate, e. g. sodium carbonate, or other suitable neutralizing agent to the mixture, only a small quantity of water being allowed to be present in the mixture. This quantity is below about 10%, preferably not more than about 5%. An appropriate temperature, which varies with the nature of the reagents employed, is to be maintained. After completion of the reaction the product may be purified in any convenient manner, e. g. extraction, filtration, or distillation.

It is remarkable that no reaction occurs if the reagents are absolutely dry, while with an increasing moisture content over an optimum amount of 2-4%, increasing quantities of the water-soluble compound are formed, so that with a water content of about 10% the process becomes uncommercial.

The following example illustrates the process :—

1400 lb. xylene sulphochloride and 470 lb. mono-methylamine hydrochloride are charged into a suitable mixing apparatus, and 900 lb. sodium carbonate are added at a temperature of 80-100° C. The materials are so conditioned that the total moisture content does not exceed 5%.

After disappearance of the sulphochloride, the monomethyl xylene sulphonamide is isolated in any usual way, for example by extraction from the mixture by benzene and, after distillation of the solvent, rectified in vacuo. The yield is almost quantitative.

If desired the reaction may be carried out in organic solvents or diluents such for example as benzene.

Our invention is in no way limited by the particular working conditions set out in the example, but includes any operation in which alkylamine salts, aromatic sulphochlorides and alkali carbonates, or other suitable acid-neutralizing agents react to form alkyl sulphonamides in the presence of restricted quantities of water.

The invention is especially intended for the manufacture of monoalkylamides of sulphonic acids, but is also applicable for the production of dialkyl amides of sulphonic acids, by using the dialkylamine salts in place of the monoalkylamine salts.

What we claim and desire to secure by Letters Patent is :—

1. Process for the manufacture of alkyl amides of aromatic sulfonic acids, characterized in that alkylamine salts, sulfochlorides and acid neutralizing agents are caused to react together in the presence of water restricted to a small quantity.

2. Process for the manufacture of alkyl amides of aromatic sulfonic acids, characterized in that alkylamine salts, sulfochlorides and acid neutralizing agents are caused to react together in the presence of water restricted to a quantity below about 10 per cent.

3. Process for the manufacture of alkyl amides of aromatic sulfonic acids, characterized in that alkylamine salts, sulfochlorides and acid neutralizing agents are caused to react together in the presence of water restricted to a quantity not greater than about 5 per cent.

4. Process for the manufacture of alkyl amides of aromatic sulfonic acids, characterized in that alkylamine salts, sulfochlorides and alkali carbonates are caused to react together in the presence of water restricted to a quantity below about 10 per cent.

5. Process for the manufacture of alkyl amides of aromatic sulfonic acids, characterized in that alkylamine salts, sulfochlorides and alkali carbonates are caused to react together in the presence of water restricted to a quantity not greater than about 5 per cent.

6. Process for the manufacture of monomethylxylene sulfonamide, characterized in that xylene sulfochloride, monomethylamine hydrochloride and an acid neutralizing agent are caused to react together in the presence of water restricted to a small quantity.

7. Process for the manufacture of monomethylxylene sulfonamide, characterized in that xylene sulfochloride, monomethylamine hydrochloride and alkali carbonate are caused to react together in presence of water restricted to a quantity below about 10 per cent.

8. Process for the manufacture of monomethylxylene sulfonamide, characterized in that xylene sulfochloride, monomethylamine hydrochloride and sodium carbonate are caused to react together in presence of water restricted to a quantity not greater than about 5 per cent.

In testimony whereof we have hereunto subscribed our names.

WALTER BADER.
DONALD ARCHER NIGHTINGALE.